US006920951B2

(12) United States Patent
Song et al.

(10) Patent No.: US 6,920,951 B2
(45) Date of Patent: Jul. 26, 2005

(54) REGENERATIVE DAMPING METHOD AND APPARATUS

(75) Inventors: Xubin Song, Canton, MI (US); Zhesheng Li, Dearborn Heights, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 39 days.

(21) Appl. No.: 10/418,927

(22) Filed: Apr. 17, 2003

(65) Prior Publication Data

US 2004/0206561 A1 Oct. 21, 2004

(51) Int. Cl.$^7$ .............................................. B60K 25/10
(52) U.S. Cl. ....................... 180/165; 188/267; 318/376
(58) Field of Search ............................... 180/165, 65.3; 318/375–378; 188/267, 267.2

(56) References Cited

U.S. PATENT DOCUMENTS

| | | | |
|---|---|---|---|
| 3,559,027 A | 1/1971 | Arsem | |
| 3,921,746 A | 11/1975 | Lewus | |
| 3,927,728 A | 12/1975 | Reime | |
| 3,941,402 A | * 3/1976 | Yankowski et al. | 280/5.514 |
| 4,032,829 A | 6/1977 | Schenavar | |
| 4,295,538 A | 10/1981 | Lewus | |
| 4,387,781 A | 6/1983 | Ezell et al. | |
| 4,815,575 A | 3/1989 | Murty | |
| 5,028,073 A | 7/1991 | Harms et al. | |
| 5,060,959 A | 10/1991 | Davis et al. | |
| 5,070,284 A | * 12/1991 | Patil et al. | 318/362 |
| 5,091,679 A | 2/1992 | Murty et al. | |
| 5,337,560 A | 8/1994 | Abdelmalek | |
| 5,391,953 A | 2/1995 | van de Veen | |
| 5,570,286 A | 10/1996 | Margolis et al. | |
| 5,590,734 A | 1/1997 | Caires | |
| 5,721,473 A | 2/1998 | DeVries | |
| 5,931,249 A | 8/1999 | Ellis et al. | |
| 5,999,868 A | 12/1999 | Beno et al. | |
| 6,111,375 A | 8/2000 | Zenobi | |
| 6,260,645 B1 | 7/2001 | Pawlowski et al. | |
| 2001/0008191 A1 | 7/2001 | Smith et al. | |
| 2003/0030523 A1 | * 2/2003 | Bell et al. | 335/220 |
| 2003/0034697 A1 | * 2/2003 | Goldner et al. | 310/17 |

FOREIGN PATENT DOCUMENTS

JP 2003-156099 * 5/2003

OTHER PUBLICATIONS

"A Preliminary Study of Energy Recovery in Vehicles by Using Regenerative Magnetic Shock Absorbers;" R.B. Goldner and P. Zerigian, Tufts University, Department of EECS; SAE Technical Paper Series 2001–01–2071; The Engineering Society for Advancing Mobility Land Sea Air and Space International; Government/Industry Meeting, Washington, D.C., May 14–16, 2001.

(Continued)

*Primary Examiner*—Bryan Fischmann
(74) *Attorney, Agent, or Firm*—Brinks Hofer Gilson & Lione (57) ABSTRACT

A regenerative damper and method for regenerative damping are disclosed. The regenerative damper uses the kinetic energy of undesirable vehicle motion to generate electrical current in a circuit. The electricity is generated by a power screw that operates like an alternator. Vehicle energy efficiency is increased by using the electrical current to charge a battery. The regenerative damper can be semi-active or passive. The semi-active embodiment is able to adapt to operating conditions to improve vehicle ride and handling, whereas the passive embodiment has a fixed response, regardless of operating conditions.

29 Claims, 4 Drawing Sheets

OTHER PUBLICATIONS

"Axial Flux, Modular, Permanent–Magnet Generator with a Toroidal Winding for Wind Turbine Applications;" E. Muljaki et al., National Renewable Energy Laboratory, Golden Colorado.

"Modeling of Continuously Variable Damper for Design of Semi–Active Suspension Systems;" Seung–Jin Heo et al., Seoul 2000 FISITA World Automotive Congress, Jun. 12–15, 2000, Seoul, Korea; F2000G307.

"Systems Modeling of a Damper Module;" Jason J. Tao and Todd A. Bishop, Delphi Automotive Systems; Reprinted from: Noise and Vibration (SP–1514); SAE Technical Paper Series 2000–01–0727; The Engineering Society for Advancing Mobility Land Sea Air and Space International; SAE 2000 World Congress, Detroit, Michigan, Mar. 6–9, 2000.

Fundamentals of Vehicle Dynamics by Thomas D. Gillespie; Mar. 1992; pp. 119–120.

The Shock Absorber Handbook by John C. Dixon; Sep. 1999; pp. 1–11.

* cited by examiner

REGENERATIVE DAMPING METHOD AND APPARATUS

BACKGROUND OF THE INVENTION

A vehicle suspension increases passenger comfort and improves vehicle handling by absorbing the impact of road imperfections, wind and vehicle actions, such as braking, acceleration and turning. The most basic elements of the suspension are the springs that support the vehicle chassis, motor and cab (known as the "the sprung masses") over the wheels and wheel components (known as "the unsprung masses"). However, springs permit or create oscillations, vibrations, response overshoots and other undesirable motions in the sprung masses.

Dampers, also known as shock absorbers, are commonly employed to further improve the handling and ride of the vehicle by reducing such undesirable motions by absorbing and dissipating a portion of the kinetic energy that would otherwise flow through the springs. For example, after traveling over a bump in the road, the sprung masses tend to oscillate. A damper will allow the suspension to diffuse the impact of the bump, but will reduce the tendency for the sprung masses to oscillate thereafter.

Dampers have two ends, one mechanically connected to the sprung masses and the other to the unsprung masses. Dampers are able to elongate and contract, to accommodate the varying distances between the sprung and unsprung masses during jounce or rebound phase. The rate of damper contraction or elongation is referred to as the damper's relative velocity. The extension of the damper between the sprung and unsprung masses dampers is known as the damper's relative displacement.

Dampers are categorized as passive, semi-active or active. For a passive damper, the damping force—the force of the dampers' resistance to extension or contraction—will always be the same for a given relative velocity, as defined by the hydraulic or mechanical interactions of its parts. In other words, the passive damper has a fixed damping force-relative velocity relationship. A semi-active damper has a variable damping force-relative velocity relationship which allows it to adapt to certain operating conditions. An active damper is capable of powering, as opposed to merely resisting, a relative velocity in the damper.

Conventional dampers work by converting the kinetic energy of undesirable vehicle motion to heat. Dampers made of solid elements dissipate the kinetic energy as heat generated by friction; newer hydraulic dampers dissipate the kinetic energy as heat generated by turbulent or viscous flow. More recent designs based on intelligent fluids such as electro—and magneto-rheological fluids also dissipate the kinetic energy as heat resulting from turbulent or viscous flow.

The energy dissipated by the dampers reduces vehicle efficiency. For example, damping forces can account for approximately 15% of the total energy expenditure for a compact car traveling at 45 miles per hour. This is a significant energy drain for the vehicle, especially in light of the increasing importance of vehicular energy efficiency, both for marketing purposes and compliance with governmental regulations.

Harnessing this otherwise wasted energy is one approach to improving vehicle efficiency. However, the concept of power regeneration from dampers has not been significantly developed. Some existing regenerative dampers are unable to contribute to overall vehicle efficiency. Other regenerative dampers are difficult to integrate with conventional suspension systems due to their complexity. Yet others have not been adapted for use in vehicles.

BRIEF SUMMARY OF THE INVENTION

According to one aspect of the present invention, there is provided a passive or semi-active regenerative damper. The damper uses the kinetic energy of undesirable vehicle motion to generate electrical current in a circuit. The electrical output of the damper can be used to charge a battery, thereby increasing the energy efficiency of the vehicle.

According to another aspect of the present invention, there is provided a method for regenerative damping in a vehicle. A power screw comprising a rotor and a stator capable of relative rotation are used to exert a damping force. Mechanical forces are transmitted to the rotor to induce the rotor's rotation relative to the stator, thereby generating an electrical current. At least one energy storage device is charged with the generated electrical current.

According to yet another aspect of the present invention, there is provided a regenerative damper for a vehicle. An electromechanical transducer is used to convert at least a portion of the vehicle's non-propulsive kinetic energy to an alternating electrical current. A rectifier electrically connected to the transducer converts the alternating electrical current to a direct current. Then a converter adjusts the voltage of the direct current. The adjusted voltage direct current is then used to charge an energy storage device.

According to still another aspect of the present invention, there is provided a regenerative damper. There is a means for exerting a damping force and converting at least a portion of said vehicle's non-propulsive kinetic energy to an alternating electrical current capable of charging a battery. The damper also includes a means for altering the damping force by variably breaking the circuit.

According to yet another aspect of the present invention, there are provided three different strategies for using the electrical output of the regenerative damper to charge batteries or other energy storage devices.

Other aspects of the present invention will become apparent in connection with the following description of the present invention.

BRIEF DESCRIPTION OF SEVERAL OF THE DRAWINGS

FIG. 2b is a graph depicting an exemplary relative velocity-damping force relationship for the embodiment of FIG. 2a;

FIG. 3b is a graph depicting an exemplary relative velocity-damping force relationship for the embodiment of FIG. 3a;

DETAILED DESCRIPTION OF THE PREFERRED EMBODIMENTS OF THE INVENTION

Figure 1:
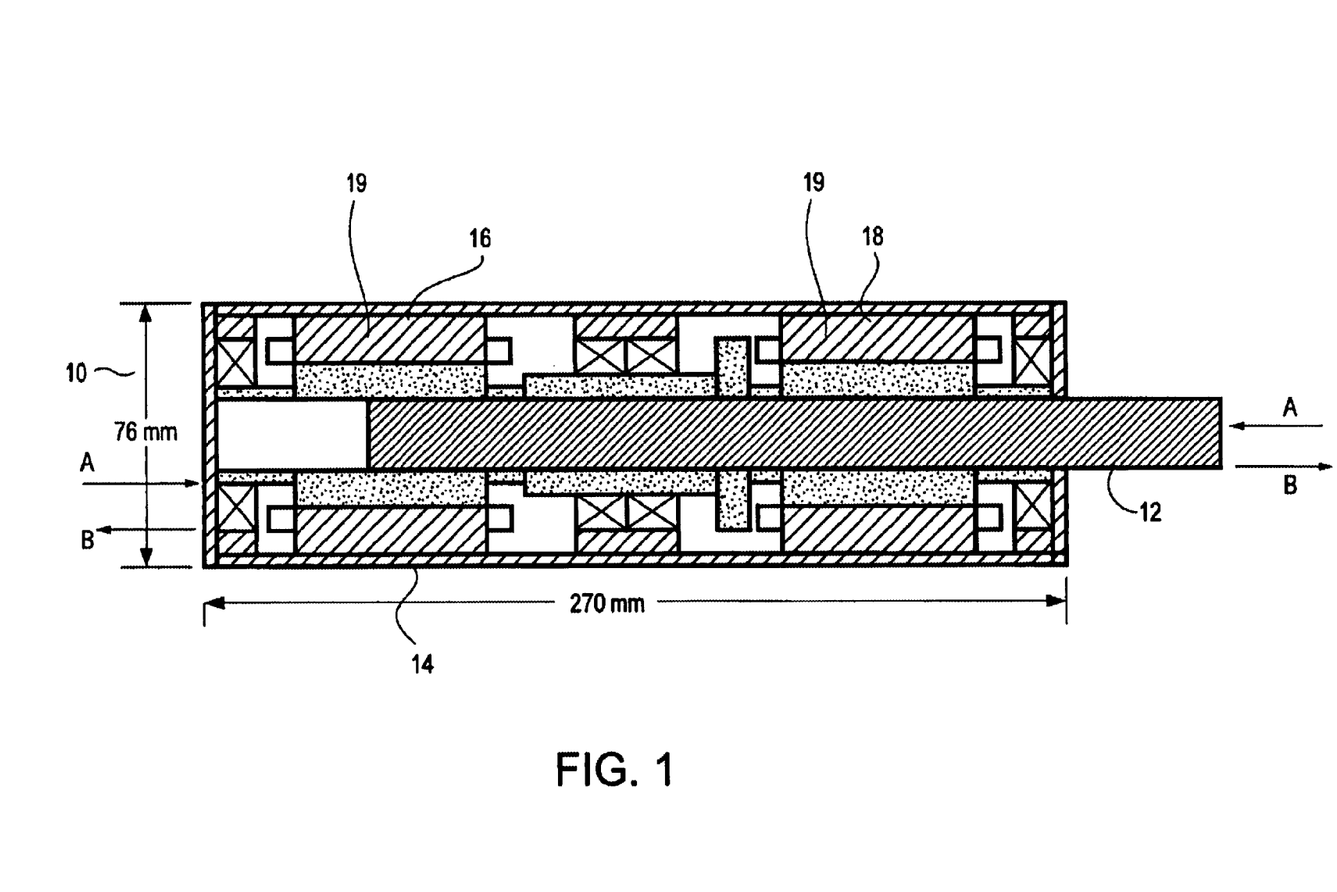
FIG. 1 is a cross-sectional view of one embodiment of the power screw used in the present invention.

As described herein, a power screw 10 may be any mechanical device that generates rotation or torque from an axial force. A cross-sectional view of one embodiment of the power screw 10 used in the present invention is shown in FIG. 1. The rod 12 can screw in or out of the housing 14 with a relatively low frictional resistance.

Axial compression forces on the rod 12 and the housing 14, as shown by the arrows marked "A," drive the rod 12 into the housing 14, concomitantly causing the rod 12 to rotate with respect to the housing 14. Axial extension forces on the rod 12 and the housing 14, as shown by the arrows marked "B," drive the rod 12 out of the housing 14, concomitantly causing the rod 12 to rotate in the opposite direction. Any power screw structure known to one of skill in the art may be used, such as a recirculating ball screw. In the preferred embodiment, a recirculating ball screw is utilized and characterized by a threaded rod 12 portion and a housing 14 which holds recirculating ball bearings.

Because the operation of this power screw 10 is analogous to that of a conventional permanent magnet alternator, as explained below, the rod 12 is also referred to as a rotor and the housing 14 is also referred to as a stator.

The length of the power screw 10, preferably about 270 mm, can be varied according to the damping requirements of the vehicle. Larger vehicles and vehicles designed to travel across extremely rough surfaces will generally require a longer power screw 10 in order to accommodate larger relative displacements. Preferably, the internal diameter of the stator 14 and the diameter of the rotor 12 are both about 26 mm, and the external diameter of the stator 14 is about 76 mm.

As stated above, the axial forces of compression and extension generated by the sprung and unsprung masses moving in relation to each other drive the rotational movement of the rotor 12 within the stator 14. These forces are transmitted by any mechanical means known in the art from the sprung and unsprung masses to the stator 14 and rotor 12 of the power screw 10. If the stator 14 is substantially stationary with respect to the sprung masses, then the rotor 12 is substantially stationary with respect to the unsprung masses. Conversely, if the rotor 12 is substantially stationary with the respect to sprung masses, then the stator 14 is substantially stationary with the respect to unsprung masses. The mechanical attachment of the power screw 10 to the vehicle will preferably allow either the rotor 12 or the stator 14 to rotate with respect to the vehicle.

At least one magnet, preferably a permanent magnet of any kind, is integrated into the rotor 12, as is known in the art. Larger damping forces can be generated when more magnets and/or stronger magnets are used. At least one winding 16 and 18 is integrated into or fixed onto the stator 14. Where a plurality of windings 16 and 18 is employed, they may be electrically connected in parallel or in series, but they are preferably connected in series. The windings 16 and 18 can be any element known in the art that works with a magnet to form an alternator. Preferably, a three-phase winding 19 is used.

As explained above, the sprung and unsprung masses move in relation to each other, causing axial forces on the rotor 12. These axial forces drive the rotation of the rotor 12 within the stator 14. Therefore, the magnet or magnets in the rotor 12 rotate with respect to the stator 14 causing magneto-electric induction. The rotation of the magnets causes a flow of electrical current in a circuit 26 which is electrically connected to the winding or windings 16 and 18.

To compress or extend the power screw 10, energy must be expended to overcome inertia of the rotor 12, the friction between the rotor 12 and stator 14, and the resistance to flux changes within the windings 16 and 18. These forces combine to provide a substantial portion of the damping force, the force that resists changes in the damper's relative displacement.

The kinetic energy that is converted to electricity in this fashion is non-propulsive kinetic energy—the kinetic energy that is associated with the relative movement of the sprung and unsprung masses. In some situations, up to about 85% of the non-propulsive kinetic energy can be converted into electrical energy. The remainder of the non-propulsive kinetic energy will be dissipated as heat.

Figure 2A:
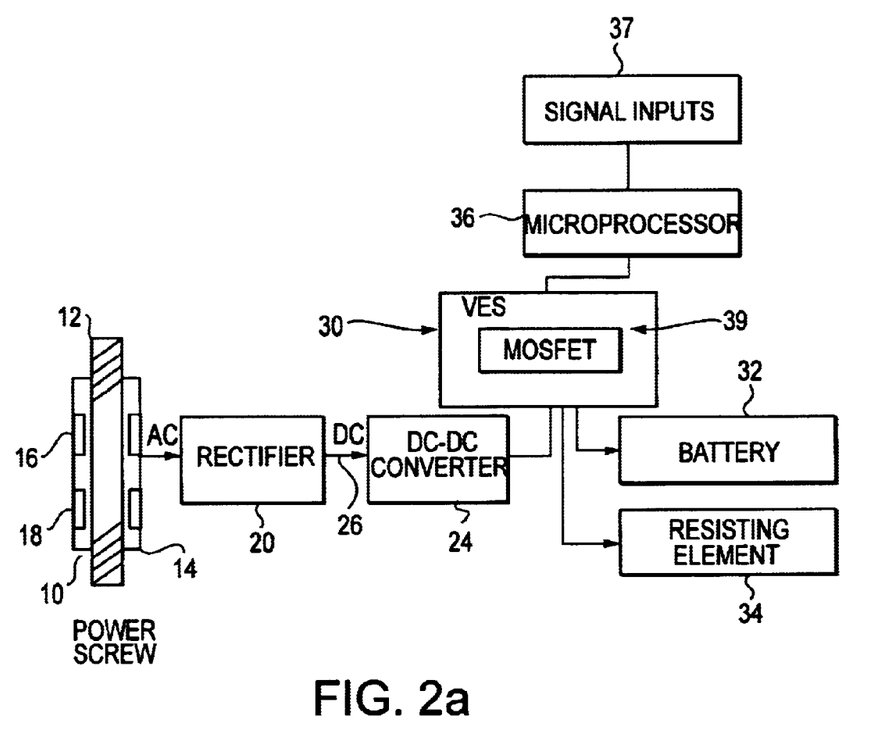
FIG. 2a is a schematic view of one embodiment of the regenerative damper of the present invention.

FIG. 2a shows a schematic view of one preferred embodiment of a semi-active regenerative damper. The damping force exerted by the semi-active damper of FIG. 2a can be varied by the methods explained below. The ability to vary the damping force allows better vehicle handling in different vehicle operating conditions. For example, it may be better to have increased damping forces for rough terrain or more aggressive driving.

The windings 16 and 18 are electrically connected to a rectifier 20, preferably through a wire or wires. The principal purpose of the rectifier 20 is to transform the alternating current (AC) output of the windings 16 and 18 into a direct current (DC). The rectifier 20 can be of any type known in the art. Preferably, a six-diode, three-branch bridge rectifier 20 is used.

The DC output of the rectifier 20 may be of a voltage unsuitable for charging the battery 32. The rectifier 20 is therefore electrically connected to a DC—DC converter 24 which can increase or decrease the voltage of the DC current. The DC—DC converter 24 can be of any type known in the art, such as a transformer or other component. After the voltage is adjusted, the current is termed "adjusted voltage direct current" (AVDC). Alternatively, the voltage could be adjusted before the electrical current is rectified, using methods known in the art.

The damping force can be altered by interrupting the current flow in the circuit 26. When the circuit 26 is open, there is less physical resistance to the rotation of the rotor 12 within the stator 14, as the load from the circuit 26 is removed. Lowering the physical resistance to the rotation of the rotor 12 within the stator 14 reduces the damping forces.

In a preferred embodiment of the semi-active damper of FIG. 2a the damping forces can be altered by interrupting the current flow through the circuit 26 via a variable electrical switch (VES) 30 electrically connected to the DC—DC converter 24. The VES 30 can open the circuit 26 ("off" state) or close the circuit 26 ("on" state). When the circuit 26 is closed, the VES 30 is electrically connected to either an energy storage device, such as a battery 32, or a resisting element 34, such as a resistor.

The VES 30 is preferably based on a MOSFET semiconductor switch 39 that modulates current flow using high frequency pulse width modulation (PWM). Using PWM, the VES 30 can vary the average current flow between an "on" state and an "off" state, and all intervening increments, depending on the pulse width or duration. In one embodiment, the PWM has a frequency (number of on-off cycles/second) of about 10 KHz to about 20 KHz.

In the embodiment of FIG. 2a, the VES 30 is controlled by a microprocessor 36 that can determine and set, in real time, the desired pulse width for the given operating conditions based on data or signal inputs 37 communicated to it. The microprocessor 36 can determine the desired pulse width by processing the signal inputs 37 using look-up tables, algorithms, circuitry, or combinations thereof, or other means known in the art.

The microprocessor 36 can be configured and programmed to process any kind of electronic data that can assist in the calculation of an appropriate damping force. For example, the microprocessor 36 may use phase and/or voltage signal inputs 37 from the power screw 10 as a basis for setting the pulse width. To acquire these particular signal inputs 37, there is preferably a direct or indirect electrical circuit between the microprocessor 36 and the windings 16 and 18. Such a connection would allow the microprocessor to acquire the phase and voltage information. Together, the phase and voltage of the windings' 16 and 18 output are, in certain circumstances, a reasonable proxy for the relative velocity, including whether the power screw 10 is in jounce or rebound phase. The suspension compresses during the jounce phase and elongates during the rebound phase.

The microprocessor 36 preferably sets a longer pulse width, thereby increasing the damping force, when signal inputs 37 indicate high relative velocities or extreme displacement during jounce or rebound phase. Also, the microprocessor 36 preferably increases the pulse width when signal inputs 37 indicate that the power screw 10 is in the rebound phase. This prevents response overshoots such as excessive bouncing.

Alternatively, the microprocessor 36 may vary the pulse width based on signals indicative of vehicle velocity, acceleration, centrifugal forces, and the unevenness of the road. All of these signal inputs can be communicated to the microprocessor 36 as digital or analog data, and can be used by a suitably programmed microprocessor 36 to assist the calculation of the appropriate damping force for a particular situation.

Figure 2B:
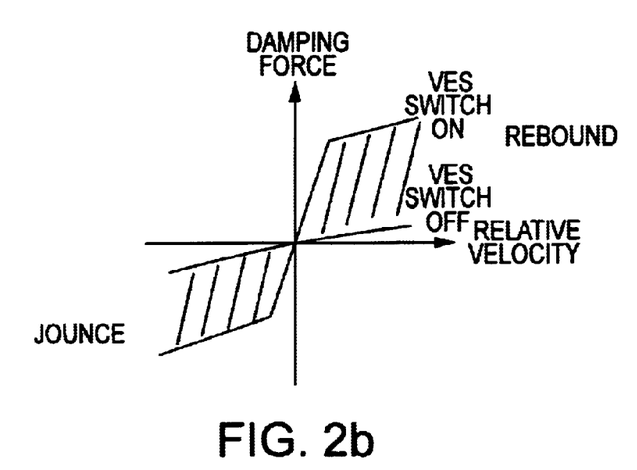

The ranges of damping forces which can be exerted by the semi-active damper of FIG. 2a for a given relative velocity are shown in the shaded region of FIG. 2b, bounded by the damping force of the completely "on" state and the completely "off" state. The y-axis of the graph plots the damping force exerted by the damper. The x-axis of the graph plots the relative velocity of the damper. FIG. 2b shows that the damping force typically increases as the relative velocity increases, and that the damping force can be varied for a given relative velocity.

When the VES 30 is in the "on" state, the current that is generated by the power screw 10 flows through the circuit 26. If the voltage of the AVDC is sufficiently high to charge the battery 32 or other energy storage device (a situation termed "high voltage AVDC"), then the VES 30 shunts the current to the battery 32 or energy storage device to charge it.

If the voltage of the current is too low to charge the battery 32 or other energy storage device (a situation termed "low voltage AVDC"), then the current is shunted to a resisting element 34, where it is dissipated as heat. The resisting element 34 is preferably a resistor with thermal capability, i.e. an ability to withstand the heat generated from the dissipation of the electrical energy. This resisting element 34 acts as a secondary load in the circuit 26, so that, when necessary, the damping forces can remain elevated, even when the voltage is too low to have a battery 32 or other energy storage device serve as a load on the circuit 26.

Figure 3A:
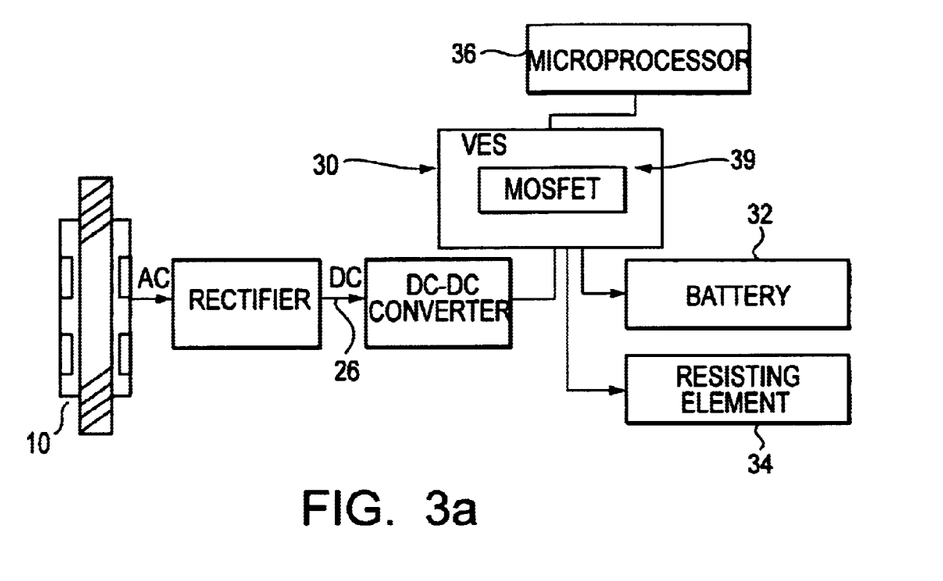
FIG. 3a is a schematic view of another embodiment of the regenerative damper of the present invention.
Figure 3B:
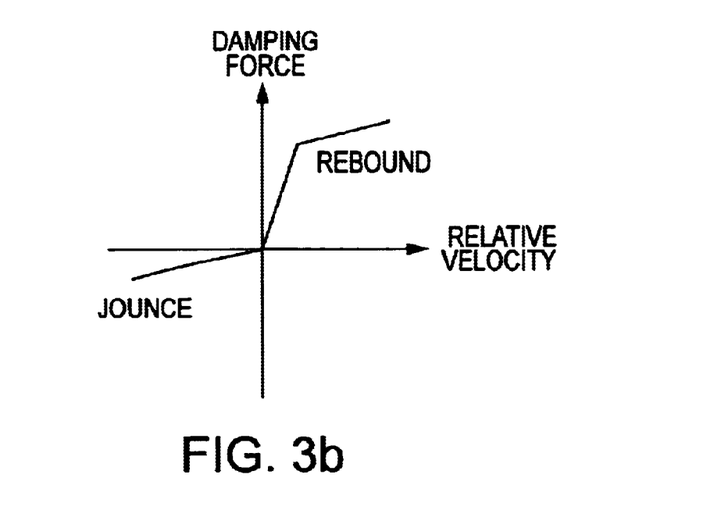

A preferred embodiment of the passive regenerative damper is shown in FIG. 3a. The passive regenerative damper is not able to vary its relative velocity-damping force profile. In this embodiment, the microprocessor 36 controls the VES 30, thereby setting the pulse width in the same manner as the semi-active embodiment, but does not adaptively vary the pulse width. Alternatively, a simple circuit can be employed in place of the microprocessor to set the pulse width. An exemplary relative velocity-damping force profile for the passive regenerative damper of FIG. 3a is shown in FIG. 3b. The y-axis of the graph plots the damping force exerted by the damper. The x-axis of the graph plots the relative velocity of the damper.

The VES 30 in the passive regenerative damper of FIG. 3a preferably uses the phase of the AC output from the windings 16 and 18 to create an asymmetry in the damping forces. When the AC phase or other signal indicates that the power screw 10 is in jounce phase, the VES 30 opens the circuit 26 to reduce the damping force. When the AC phase or other signal indicates that the power screw 10 is in rebound phase, the VES 30 closes the circuit 26 to increase the damping force. Alternatively, PWM using pre-set pulse widths can be employed to increase current flow during rebound phase, in comparison to jounce phase.

In the passive regenerative damper of FIG. 3a, the VES 30 distributes electricity to the battery 32 or a resisting element 34 as described above for the semi-active embodiment of FIG. 2a. As in the semi-active regenerative damper of FIG. 2a, selective connection of the VES 30 to the resisting element 34, when the output of the DC—DC converter 24 is a low voltage AVDC, allows the damping forces to remain elevated.

Figure 4A:
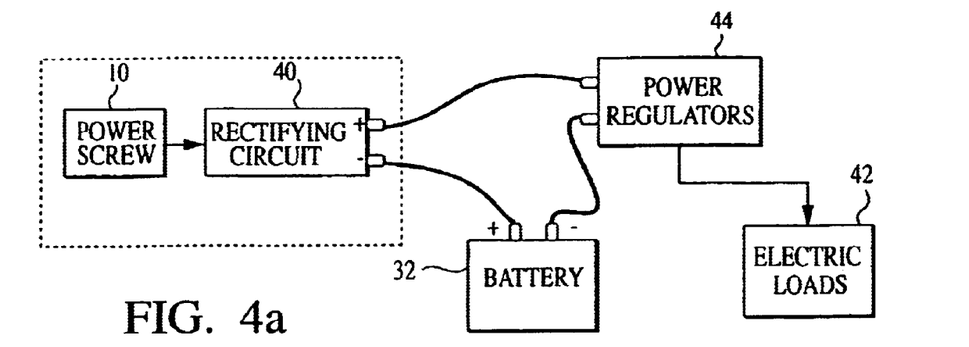
FIG. 4a is a schematic diagram of a series connection from the battery to the rectifying circuit and the power regulators of the present invention.
Figure 4B:
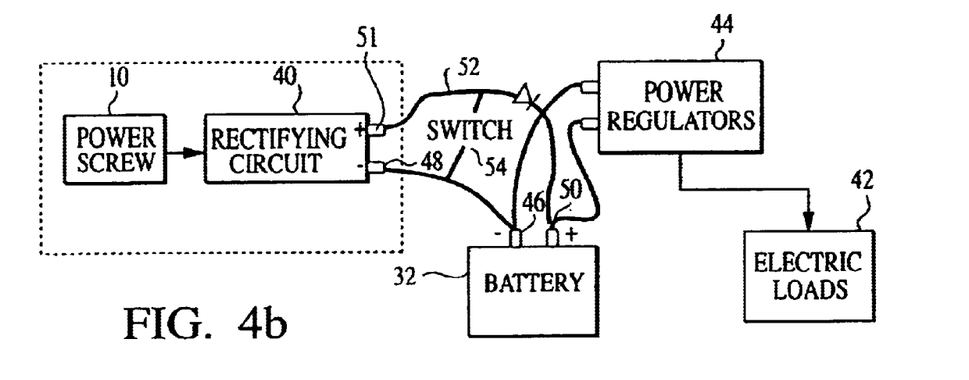
FIG. 4b is a schematic diagram of a parallel connection from the battery to the rectifying circuit and the power regulators for voltage boosting of the present invention.
Figure 4C:
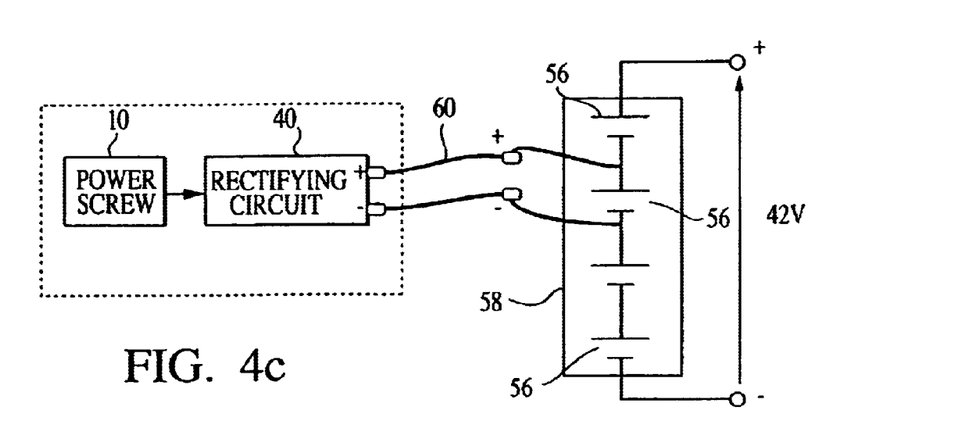
FIG. 4c is a schematic diagram of an embodiment of the present invention utilizing a circuit for low voltage charging of a high voltage composite battery.

Three exemplary strategies for distributing generated power are shown in FIGS. 4a–c. In all of the figures, the rectifying circuit 40 is connected to the power screw 10. The rectifying circuit 40 encompasses the rectifier 20, the DC—DC converter 24, and VES 30 described above. The connection of the VES 30 to the resisting element 34 is not shown in these figures. The electric loads 42 comprise any of the auxiliary electrical systems of the vehicle. The power regulators 44 are separate components within the vehicle electrical system, or are integral parts of the individual auxiliary electrical devices. The auxiliary electrical devices include, for example, power windows, lights, power steering and the audio system. The power regulators 44 hold the voltage and current levels constant for the auxiliary electrical systems.

In FIG. 4a, a battery charging strategy that provides a secondary power supply to the electric loads 42 is shown. The battery 32 is connected in series to the power regulators 44 and the rectifying circuit 40. The power regulators 44 are then connected electrically to the electric loads 42. This strategy enables the system to charge the battery 32 and serve as a secondary power supply to the electric loads 42 when there are significant loads on the circuit connected to the battery 32 or the battery's current output is otherwise low.

In FIG. 4b, a voltage-boosting strategy for battery charging is shown. This is accomplished by connecting the battery 32 in parallel to the power regulators 44 and the rectifying circuit 40. The negative terminal 46 of the battery 32 is connected to the negative terminal 48 of the rectifying circuit 40, and the positive terminal 50 of the battery 32 is connected to the positive terminal 51 of the rectifying circuit 40. The circuit 52 that connects the battery 32 to the rectifying circuit 40 contains an inductance switch 54 for shorting the circuit 52 when the voltage output of the rectifying circuit 40 is too low. This strategy boosts the voltage of the current from the rectifying circuit 40 so that the battery 32 can be charged.

In FIG. 4c, a low voltage charging strategy is shown. This strategy is well adapted to charging the high voltage, multiple cell batteries generally used to propel electric or hybrid vehicles. The battery is preferably a nickel metal hydride or lithium ion battery. While these batteries often have high voltages, each component battery cell 56 contributes a fraction of that total voltage, and thus can be charged at a lower voltage. Therefore, a current from the rectifying circuit 40 having a voltage insufficient for charging the entire composite battery 58 can be used to charge one or more battery cells 56 within the composite battery 58. FIG. 4c shows a representation of a circuit 60 connected to a battery cell 56 of a composite battery 58.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A method for regenerative damping in a vehicle, comprising:
   providing a power screw comprising a rotor and a stator capable of relative rotation, said power screw configured to exert a damping force;
   transmitting a mechanical force to said rotor to induce said rotor's rotation relative to said stator;
   generating an electrical current from said rotation;
   converting said electrical current to a direct electrical current having a voltage;
   adjusting said voltage of said direct electrical current to generate an adjusted voltage (AVDC), said AVDC comprising a low voltage and high voltage AVDC; and
   charging at least one energy storage device with said electrical current.

2. The method of claim 1, further comprising:
   interrupting said electrical current to adjust said damping force.

3. The method of claim 2, wherein the step of interrupting said electrical current to adjust said damping force is performed by a pulse width modulator.

4. The method of claim 3, wherein said pulse width modulator is operatively connected to a microprocessor capable of calculating and setting a pulse width.

5. The method of claim 4, wherein said pulse width modulator comprises a MOSFET switch.

6. The method of claim 1, further comprising:
   shunting said low voltage AVDC to a resistance; and
   shunting said high voltage AVDC to said energy storage device.

7. The method of claim 1, wherein said at least one energy storage device includes at least one battery.

8. The method of claim 7, wherein said at least one battery is electrically connected to a rectifying circuit and at least one power regulator in series, said at least one power regulator electrically connected to one or more auxiliary devices.

9. The method of claim 8, wherein said power screw further comprises at least one winding integrated into said stator.

10. The method of claim 9, wherein said at least one winding comprises a three-phase winding.

11. The method of claim 10, wherein said power screw further comprises two three-phase windings integrated into said stator, said two three-phase windings connected in series.

12. The method of claim 7, wherein said at least one battery is electrically connected to a rectifying circuit and at least one power regulator in parallel, whereby voltage from rectifying circuit is boosted for charging said battery.

13. The method of claim 7, wherein said at least one battery comprises at least one battery cell.

14. The method of claim 13, further comprising:
   electrically connecting said at least one battery cell to a rectifying circuit, whereby said electrical current is capable of charging said at least one battery cell.

15. A regenerative damper for a vehicle comprising:
   an electromechanical transducer for converting at least a portion of said vehicle's non-propulsive kinetic energy to an alternating electrical current, wherein said kinetic energy to alternating electrical current transducer comprises a rotary power screw;
   an electrical circuit, electrically connected to said electromechanical transducer;
   a rectifier, electrically connected to said electrical circuit, for converting said alternating electrical current to a direct current having a voltage;
   a converter, electrically connected to said rectifier, for adjusting said voltage of said direct current, and producing an adjusted voltage direct current (AVDC); and
   an energy storage device electrically connected to said converter, said energy storage device capable of being charged by said direct current.

16. The regenerative damper of claim 15, further comprising a variable electrical switch (VES) for interrupting said electrical circuit.

17. The regenerative damper of claim 16, wherein said VES comprises a MOSFET switch.

18. The regenerative damper of claim 17, further comprising a microprocessor operatively connected to said MOSFET switch, said microprocessor capable of adaptively setting a pulse width for said MOSFET switch.

19. The regenerative damper of claim 16, further comprising a resistor operatively connected to said VES.

20. The regenerative damper of claim 19, wherein said VES can shunt said direct current to either said resistor or said energy storage device.

21. The regenerative damper of claim 15, wherein said at least one energy storage device comprises at least one battery.

22. The regenerative damper of claim 21, further comprising a power regulator, said power regulator electrically connected in series to said at least one battery.

23. The regenerative damper of claim 21, wherein said at least one battery is electrically connected to a rectifier and power regulator in parallel, whereby voltage from rectifying circuit is boosted for charging said at least one battery.

24. The regenerative damper of claim 21, wherein said at least one battery is a composite battery comprising at least one battery cell capable of being charged by said AVDC.

25. A regenerative damper for a vehicle comprising:
   a rotary power screw for converting at least a portion of said vehicle's non-propulsive kinetic energy to alternating electrical current in a circuit and exerting a damping force;
   a second conversion means, electrically connected to said first conversion means, for converting said alternating electrical current to a direct current having a voltage;

an adjustment means, electrically connected to said first and second conversion means, for adjusting said voltage of said direct current, and producing an adjusted voltage direct current (AVDC);

a storage means, electrically connected to said adjustment means, for storing said direct current; and a breaking means for variably breaking said circuit to alter said damping force, said breaking means electrically connected to said circuit.

26. The regenerative damper of claim 25, wherein said means for storing said direct current comprises a battery.

27. The regenerative damper of claim 25, wherein said means for variably breaking said circuit to alter said damping force comprises a variable electrical switch.

28. The regenerative damper of claim 27, wherein said variable electrical switch is capable of alternating connection to a resistance and said means for storing said direct current.

29. The regenerative damper of claim 25, wherein said means for variably breaking said circuit to alter said damping force comprises a means for pulse width modulation.

* * * * *